Patented Sept. 4, 1945

2,384,001

UNITED STATES PATENT OFFICE 2,384,001

COLORATION OF TEXTILE MATERIALS

Alexander James Wesson, Spondon, near Derby, England, assignor to British Celanese Limited, London, England, a company of Great Britain No Drawing. Application June 23, 1942, Serial No. 448,165. In Great Britain July 15, 1941

2 Claims. (Cl. 8—40)

This invention relates to the coloring of textile materials, foils, films, and the like of cellulose acetate or of other cellulose esters or ethers.

It has been found that very valuable colorations can be produced on such textile and other materials by applying to the latter solutions in organic liquids of water-insoluble arylamino anthraquinones and especially di-(arylamino)-anthraquinones. In this way it is possible to produce upon cellulose acetate and other cellulose ester and ether textiles a range of shades of very good fastness to light, washing, cross-dyeing, and the combustion products of coal gas. Particularly valuable results can be obtained by using 1:4-di(arylamino)-anthraquinones, since with their aid full blue to green shades, having the above-mentioned fastness properties, can be obtained. The production of such blue to green shades, having these desirable properties of fastness, has presented very serious difficulties in the past since there has been a notable lack of blue to green dyes of good fastness properties and suitable for application to cellulose acetate materials by the conventional dyeing methods. The di-(arylamino)-anthraquinones mentioned above have not hitherto been utilised commercially to any material extent for the coloration of cellulose ester or ether textiles since their affinity for these materials is very small; for example, when applied in the form of aqueous dispersions they yield very pale tints indeed.

According to the present invention, therefore, cellulose acetate or other cellulose ester or ether fibres, foils, films and the like are colored by applying thereto solutions of water-insoluble arylamino-anthraquinones in organic liquid media which are swelling agents for the material to be colored.

The organic liquid medium may be one consisting substantially of an organic liquid or liquids or it may contain water, for example 5-30% or more. It should, however, consist of organic liquid to the extent of at least 50%. The organic liquid portion of the liquid medium, or at least the major portion thereof, advantageously has a boiling point below 130° C. and preferably below 100° C. Examples of suitable liquids are aliphatic alcohols, for example, methyl, ethyl, and isopropyl alcohol, halogenated aliphatic hydrocarbons, for example, di-chlorethylene, tri-chlorethylene, and ethylene dichloride, and carboxylic esters, particularly the esters of lower aliphatic alcohols with lower aliphatic acids, for instance, ethyl acetate and isopropyl acetate. Mixtures of liquids which may be employed are those referred to in British Patent No. 460,575 and particularly the mixtures of carboxylic esters with alcohols, for example, a mixture of ethyl acetate and ethyl alcohol. Of the mixtures described in Patent No. 460,575 those containing but small proportions of water are to be preferred generally.

The liquid medium employed is a swelling agent for the cellulose acetate or other cellulose ester or ether to be colored but it should not be a solvent for the said material, nor should it contain in general more than a small proportion of any component which is a solvent for the material. For example, the content of any component which is a solvent for the material should not usually exceed about 15%. In the case of treating cellulose acetate materials, ethyl alcohol containing a small proportion of acetone has been found very suitable, for instance a mixture of about 20 parts by volume of acetone with 280 parts by volume of methylated spirit.

Various arylamino-anthraquinones can be employed and the aryl radicle can be, for example, an aryl radicle of the benzene series containing but one benzene nucleus, e. g. phenyl, o-, m-, or p-tolyl, o-, m-, or p-methoxy-phenyl, o-, m-, or p-ethoxyphenol, o-, m-, or p-(beta-hydroxyethoxy) - phenyl, or p-(acetylamino) - phenyl. The compounds may contain one or more than one arylamino group and nuclear substituents may be present in addition to the arylamino group or groups, for example, hydroxyl groups, free amino groups, alkylated amino groups, or aralkylated amino groups. Sulphonic or carboxylic groups should be absent.

The following are some arylamino-anthraquinones which may be employed, colors being indicated in brackets.

(a) 1-arylamino - anthraquinones free from further nuclear substituents, e. g. 1-phenylamino-anthraquinone (red), 1 - m - tolylamino-anthraquinone (red), 1-ortho-methoxy phenyl-amino-anthraquinone (bluish-red), 1-(p-phenyl-phenylamino) - anthraquinone (red), and 1 - (alpha-naphthylamino)-anthraquinone (red).

(b) 1-hydroxy-4-arylamino-anthraquinones, e. g. 1-hydroxy-4 - p - tolylamino - anthraquinone (blue-violet), 1-hydroxy-4-(p-acetylamino-phenylamino)-anthraquinone (blue-violet), and 1:8-dihydroxy-4-(p-acetylamino phenylamino) - anthraquinone (blue).

(c) 4-arylamino-anthraquinones containing a free amino group or an alkyl-amino group in the 1-position, e. g., 1-amino-4-phenylamino-anthraquinone (violet-blue), 1-amino-4-p - tolylamino-anthraquinone (blue), 1 - amino - 4 - (p-acetylamino - phenylamino) - anthraquinone (blue), 1-amino-4-(p-amino-phenylamino)-anthraquinone (blue), and 1-methylamino-4-(p-amino-phenylamino)-anthraquinone (blue).

(d) 1:4-, 1:5-, and 1:8-di-(arylamino)-anthraquinones, e. g., 1:4-di-(phenylamino)-anthraquinone (blue), 1:4-di-(m-tolyl-amino)-anthraquinone (blue), 1:4-di - (o - methoxy - phenylamino)-anthraquinone (blue-green), 1:4-di-(o-methoxy phenylamino)-5 - hydroxy - anthraquinone (blue-green), 1:5-di-(o-methoxy-phenylamino)-anthraquinone (violet), 1:8-di-(o-methoxy-phenylamino)-anthraquinone (violet), 1:5-di - (phenylamino)-anthraquinone (red-violet), 1:8 - di-(phenylamino)-anthraquinone (violet), and 1:4 - di-(alpha-naphthylamino)-anthraquinone (blue-green).

Of the arylamino anthraquinones which can be employed in accordance with the invention the ortho-methoxy-phenylamino anthraquinones are particularly useful in that their solubility in organic liquids is substantially greater than that of the analogous compounds which do not contain the o-methoxy group.

Mixtures of two or more of the arylamino-anthraquinones may be employed, if desired, or mixtures of arylamino anthraquinones with dyes of other kinds.

Particularly valuable results can be obtained by employing arylamino anthraquinones which have little or substantially no affinity for the cellulose acetate or other cellulose ester or ether when they are applied as aqueous dispersions. The di-(arylamino) anthraquinones are very suitable in this respect and yield colored products which are very fast to washing and from which little color bleeds on to wool, cotton, or other textile material subjected to scouring or other aqueous treatment in contact therewith. As already indicated, the 1:4-di-(arylamino)-anthraquinones are especially valuable by reason of their yielding blue to green shades which are not only of very good fastness to washing but are also very resistant to the action of combustion products of coal gas.

It is a feature of the new process that it enables cellulose acetate and other cellulose ester or ether fibres, foils, films or the like to be obtained which contain at least 0.05 per cent, and particularly from 0.1 to 1 per cent of an arylamino-anthraquinone which has little or no affinity for the cellulose acetate or other cellulose ester or ether when applied as an aqueous dispersion.

Arylamino-anthraquinones which have a substantial affinity for the cellulose ester or ether to be colored when applied as aqueous dispersion can also be applied, with great advantage, as solutions in organic liquid media in accordance with the invention. By such mode of application it is possible to obtain fuller shades than can be produced by the same dye applied as an aqueous dispersion. Examples of such dyes are the arylamino-anthraquinones mentioned under (c) above. These contain as nuclear substituents both an arylamino group and a free amino group or an alkylamino group. Another arylamino-anthraquinone of the latter type is 1-amino-5-phenylamino-4:8-dihydroxy-anthraquinone.

The cellulose ester or ether textile material treated in accordance with the invention can be staple fibre whether in the form of a mass or in the form of sliver, yarn, or fabric. Again the textile material may be a product, whether yarn or fabric, in which the fibres are continuous. The new coloring processes can also be applied to mixed materials consisting of both cellulose ester or ether fibres and fibres of other kinds, for example, cotton, regenerated cellulose, or animal fibres.

The solutions of the arylamino anthraquinones can be applied to the cellulose ester or ether materials in various ways. Usually it is most convenient to utilise mechanical impregnation methods, that is methods in which the material is impregnated with a quantity of dye-liquid containing the whole of the coloring matter necessary to produce the desired shade. The liquid is then removed from the material by evaporation. The application of the requisite proportion of the dye liquid to the material can be effected by spraying. Generally, however, it is advantageous to saturate the material with a quantity of liquid in excess of that required to produce the shade in view and thereafter to remove the excess liquid from the material, for example, by squeezing or centrifuging. Staple fibre or yarn in hank form can, for example, be immersed in the dye-liquid and thereafter centrifuged until it contains but the proportion of dye-liquid necessary to impart the desired color. Fabrics are conveniently impregnated with the dye-liquids with the aid of a padding mangle, for instance the padding mangle described in United States Patents Nos. 2,184,559 and 2,189,914.

Yarns also may be colored by running them through the dye-liquids and thereafter drying them after removing by squeezing or otherwise any liquid in excess of that required to produce the desired shade. In the case of treating running threads in this way it is often advantageous to include in the dye-liquid an organic liquid which is a solvent for the dye but has a moderately high boiling point, for example a boiling point of 120-180° C. The best results are obtained with such liquids when they are not solvents or strong swelling agents for the cellulose ester or ether but are good solvents for the arylamino anthraquinones. The use of such liquids in this way is advantageous from the point of view of improving the fastness to rubbing of the resulting dyeing. For example, cyclohexanol, chlorobenzene, or other of the liquids having these properties and specified in U. S. Patent No. 2,274,751 can be used.

The solutions of the arylamino-anthraquinones can, in accordance with the present invention, also be used to color the materials by bath dyeing methods, that is methods in which the material is immersed in the solution and allowed to absorb the arylamino-anthraquinone therefrom. For example, the materials to be colored can be immersed, for a substantial time, e. g. 15 minutes to one hour in a solution of the arylamino-anthraquinone in the organic liquid medium. In such cases the liquid may conveniently be 30 to 50 times the weight of the material to be colored and contain from 1 to 8 per cent of the arylamino-anthraquinone (based on the weight of material to be colored). It has been found that even those arylamino-anthraquinones which have little or no affinity for the material when applied as aqueous dispersions (e. g. the di-(arylamino)-anthraquinones) are taken up substantively, to a considerable extent, from solutions in organic liquids.

The invention is of especial value for the coloration of fibres, foils, films, and the like of cellulose acetate. It can also be applied in the coloration of like materials of other cellulose esters or ethers, for example cellulose propionate, butyrate, aceto-propionate, aceto-butyrate, and nitro-acetate, and methyl-, ethyl- and benzyl celluloses.

The colored materials produced in accordance with the invention may subsequently be topped with other dyes and particularly with direct dyeing dyes for cellulose esters or ethers, for example, the water-insoluble dyes of the nitro-diarylamine, azo, or aminoanthraquinone series, such as are extensively employed for the coloration of cellulose acetate materials. The topping coloring matter may be applied either uniformly or locally according to the effects it is desired to produce. The topping colors may be applied, for instance, in aqueous solution or dispersion according to their nature.

Example 1

20 grams of 1:4-di-(o-methoxyphenylamino)-anthraquinone are boiled with 2 litres of acetone and the latter poured into 28 litres of methylated spirit at about 60° C. The mixture is then cooled to 30° C. and a cellulose acetate fabric is soaked therein for 10 minutes and then squeezed so that it retains about its own weight of the liquid. The material is then dried. In this way full bluish green shades are obtained which are of excellent fastness to cross-dyeing, light and the combustion products of coal gas. The fabric contains about 0.3% of its weight of the arylamino-anthraquinone.

Example 2

A dye-bath is prepared consisting of 500 grams of 1-amino-4-phenylamino-anthraquinone dissolved in a mixture of 280 litres of methylated spirit, 120 litres of water, and 20 litres of cyclohexanol; 10 kilograms of cellulose acetate yarn are worked in this dye-bath for half an hour at 20° C., and then centrifuged and dried. Violet-blue shades are obtained.

1-amino-5-phenylamino-4:8-dihydroxy-anthraquinone, 1-amino-4-(p-aminophenylamino)-anthraquinone, and 1-methylamino-4-(p-aminophenylamino)-anthraquinone can be applied similarly. The last two can be diazotised on the material and coupled with phenol whereby green shades are obtained.

Having described my invention what I desire to secure by Letters Patent is:

1. Process for the coloration of cellulose acetate fibers, foils, films and the like, which comprises applying thereto a solution of 1:4-di-(ortho-methoxy-phenylamino)-anthraquinone in a liquid medium which is a swelling agent for the cellulose acetate and which comprises a mixture of acetone and ethyl alcohol.

2. Process for the coloration of cellulose acetate fibers, foils, films and the like, which comprises applying thereto a solution of 1:4-di-(ortho-methoxy-phenylamino)-anthraquinone in a liquid medium which is a swelling agent for the cellulose acetate and which comprises a mixture of 20 parts by volume of acetone and 280 parts by volume of methylated spirits.

ALEXANDER JAMES WESSON.